United States Patent
Kajiura

(10) Patent No.: US 6,364,674 B1
(45) Date of Patent: *Apr. 2, 2002

(54) EJECTING APPARATUS

(75) Inventor: Motomu Kajiura, Tokyo (JP)

(73) Assignee: FCI Americas Technology, Inc., Reno, NV (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,536

(22) Filed: Oct. 2, 1997

(30) Foreign Application Priority Data

Oct. 2, 1996 (JP) .............................. 8-261928

(51) Int. Cl.⁷ .............................................. H01R 13/62
(52) U.S. Cl. ...................................................... 439/159
(58) Field of Search ................................ 439/152, 159, 439/160

(56) References Cited

U.S. PATENT DOCUMENTS

| | | | |
|---|---|---|---|
| 5,179,871 A | | 1/1993 | Orimoto et al. ............... 74/516 |
| 5,383,789 A | | 1/1995 | Watanabe .................... 439/159 |
| 5,421,737 A | | 6/1995 | Chen et al. .................. 439/157 |
| 5,466,166 A | * | 11/1995 | Law et al. ................... 439/159 |
| 5,492,481 A | * | 2/1996 | Lewis ......................... 439/159 |
| 5,507,658 A | | 4/1996 | Ho |
| 5,533,906 A | | 7/1996 | Abe ............................ 439/159 |
| 5,599,197 A | * | 2/1997 | Ishida et al. ................. 439/159 |
| 5,791,920 A | * | 8/1998 | Tomioka et al. ............. 439/159 |
| 5,829,996 A | * | 11/1998 | Yamane et al. .............. 439/159 |
| 5,967,811 A | * | 10/1999 | Yamamoto et al. .......... 439/159 |
| 6,033,243 A | * | 3/2000 | Kajiura ........................ 439/159 |
| 6,036,512 A | * | 3/2000 | Toshitaka .................... 439/159 |
| 6,045,366 A | * | 4/2000 | Motomu ....................... 439/64 |

FOREIGN PATENT DOCUMENTS

| | | |
|---|---|---|
| EP | 0 607 848 A2 | 7/1994 |
| EP | 0 687 035 A2 | 5/1995 |
| GB | 2 282 277 | 9/1994 |
| WO | WO 96/18224 | 12/1995 |

* cited by examiner

*Primary Examiner*—Gary Paumen
*Assistant Examiner*—Ross Gushi
(74) *Attorney, Agent, or Firm*—Woodcock Washburn LLP

(57) ABSTRACT

An ejecting apparatus includes an ejecting plate 26 that has an engaging tab 32 for engaging with a memory card and is guided in the direction in which the memory card is inserted into and removed from a connector frame 10. A lever 36 is provided on the connector frame 10 so that it may be moved rotationally around a fulcrum 38. A push rod 56 presses one end of the lever and moves the lever rotationally on the fulcrum. The lever has a first pushing position 40 that disconnects the memory card from terminals 22 by moving the ejecting plate 26 in the removal direction when the lever is moved rotationally by the push rod. A projecting tab 44 at the second pushing position moves the memory card M further in the removal direction by directly moving the memory card after it is disconnected from the connector terminals. The upward projecting profile 40 is located on the lever 36 between the fulcrum 38 and the projecting tab 44.

16 Claims, 4 Drawing Sheets

FIG. 6 (A)
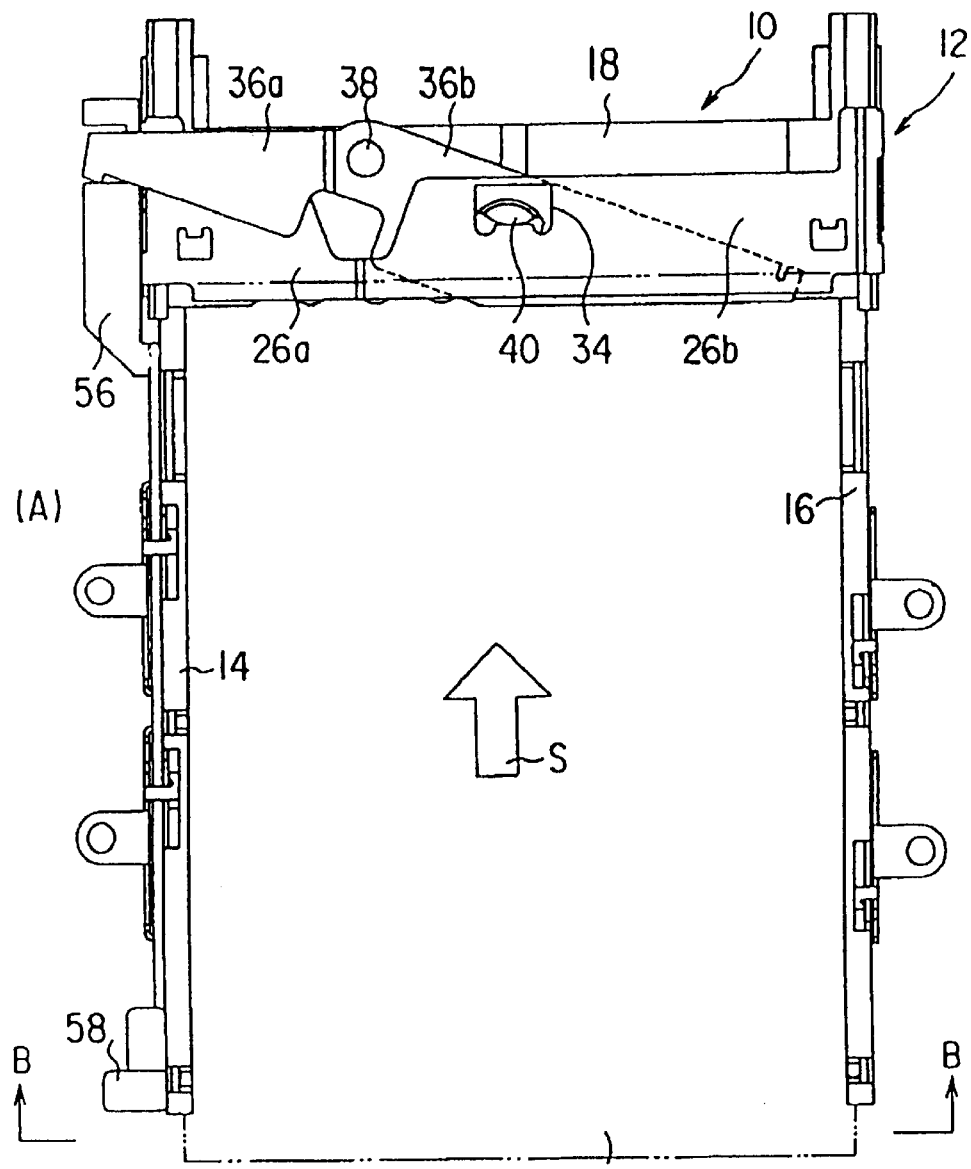
(A)
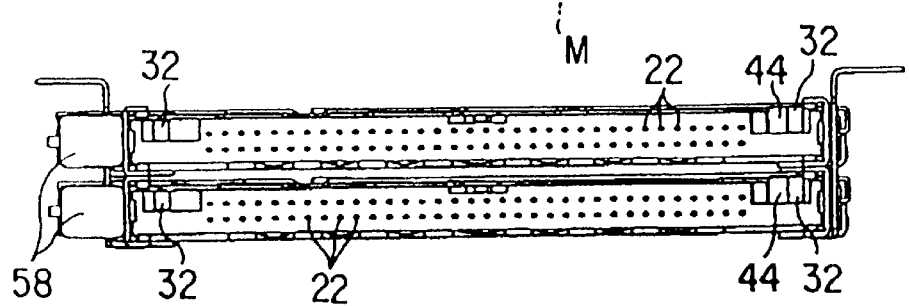
FIG. 6 (B)

EJECTING APPARATUS

BACKGROUND OF THE INVENTION

1. Field of the Invention

This invention relates generally to an electrical connector and more particularly to a variable force ejecting apparatus for disconnecting and removing a memory card from the connector. Memory cards include cards with various types of storing mediums, such as IC cards (Type I), cards with various I/O functions for modems and local area networks (Type II), and hard disks (Type III).

2. Brief Description of Prior Developments

To enhance the miniaturization and expand the use of electronic equipment, various types of connector devices have been developed to be used with known card-like data processing mediums such as memory cards. Usually a connector device is used to connect a data medium such as a memory card to electronic equipment, such as a computer. The frame of the connector device is formed by a pair of parallel rails and a header joining the rails with an insert slot opposite the header. The header includes an array of contact terminals that are connected to internal units in the electronic equipment. A memory card can be inserted in the slot and guided along the rails. The contact terminals of the memory card connect with the contact terminals of the header, thereby not only electrically connecting the terminals with each other but also mechanically fixing the memory card in place.

Some connector devices are also provided with an ejecting apparatus that disconnects (i.e. unplugs) the contact terminals of the memory card from the pin terminals of the header, thus mechanically disconnecting the memory card from the connector device.

Generally, the ejecting apparatus includes an ejecting plate that slides along the rails of the connector. The ejecting plate has at least one engaging tab which engages the edge of the memory card when the memory card is inserted into the connector and is moved to the connected position. The ejecting plate is coupled with a lever pivotally mounted on the connector. A movable push rod is coupled with the end of the lever and generally moves in the direction opposite to which the memory card is inserted or removed. The push rod on the lever using the pivot point on the connector frame as a fulcrum and transmits the force acting on the push rod to the ejecting plate.

To eject the memory card from the connector device, the push rod, which often projects outside the electronic equipment is pushed in, which thereby causes the lever to rotate, moving the ejecting plate toward the slot of the connector. This movement causes the memory card, whose forward end face is engaged by the tab section of the ejecting plate to be disconnected from the contact terminals of the connector frame. Thus, even when the force acting on the push rod is small, the lever acts with a mechanical advantage and exerts a larger force on the ejecting plate, enabling the memory card to be disconnected and moved. Generally, the lever and ejecting plate are mounted on the connector frame using a cover plate, thus creating a thickness of three layers of plates.

As electronic equipment has been getting more compact and more sophisticated in recent years, it is desirable that the push rod and the connector frame with the inserted memory card be flush and reside completely inside of the electronic equipment. Thus, when the push rod is pushed in to eject the memory card, only a small length of the memory card may project from the electronic equipment, making it difficult to manually grasp and remove the card. The amount of the memory card projecting from the connector could be made larger by lengthening the lever of the ejecting mechanism to increase the moving distance of the ejecting plate. This, however, would make the ejecting apparatus larger, requiring a larger installation space. Also, the projecting force of the push rod increases proportion to the length of the lever which could cause the memory card to forcefully eject from the connector. Therefore, it is difficult to meet the demands for the miniaturization of electronic equipment.

SUMMARY OF THE INVENTION

It is, accordingly, an object of the present invention to provide a compact ejecting apparatus with a simple structure capable of disconnecting the contact terminals of the memory card from the connector frame and increasing the amount of memory card projecting from the connector frame.

The foregoing object is accomplished by providing an ejecting apparatus for disconnecting and removing a memory card from a connector frame that electrically and mechanically connects to the memory card by an array of contact terminals. The ejecting apparatus includes an ejecting plate that has an engaging tab for engaging with the memory card and is guided in an insertion and removal direction in which the memory card is inserted into and removed from the connector frame. A lever is rotatably mounted on a pivot on the connector frame so that it may be moved rotationally, with the pivot acting as a fulcrum. A reciprocable push rod contacts one end of the lever to move the lever rotationally around the fulcrum. A first force supplying section on the lever disconnects the memory card from the contact terminals of the connector frame by moving the ejecting plate when the lever is initially rotated by the push rod. A second pushing position on the lever moves the memory card further in the removal direction by directly pushing the memory card after the card has been disconnected from the connector terminals. The first pushing position is located on the lever between the fulcrum and the second pushing position of the lever.

In the present invention, when the lever of the ejecting apparatus is initially rotated by the push rod, the first pushing position moves the ejecting plate in the removal direction of the memory card. As a result, the ejecting plate causes the engaging tabs to engage the memory card and disconnect the contact terminals of the memory card from the contact terminals of the connector frame. Once the memory card has been disconnected from the terminals, the second force applying section of the lever begins to push the memory card directly. Since the second pushing position is a greater distance from the fulcrum than the first pushing position, this allows the memory card to move further out of the connector frame beyond the moving distance of the ejecting plate, thus enabling a larger part of the memory card to project from the electric equipment.

The lever of the present invention is formed as a parallel stepped structure having an upper section on one side of the fulcrum and a lower parallel section on the other side of the fulcrum. The ejecting plate is formed into the reverse stepped structure to that of the lever and guides the distal end of the lever along between the ejecting plate and the connector frame. Thus, when the distal end of the lever extends a great distance past the fulcrum, the movement of the lever is guided smoothly, enabling the memory card to be removed reliably.

Furthermore, it is desirable that the ejecting plate should have a roughly rectangular opening about in the middle of the width of the memory card and that the first pushing position of the lever has an upward projecting profile projecting into the opening, the projecting profile having an arced shape curved convexly in both directions. With this structure, at both the time of removal and insertion of the memory card, the front edge of the opening of the ejecting plate comes into contact with the curved surface of the upward projecting profile forming the first pushing position, thereby transmitting force smoothly from the push rod to the lever to the ejecting plate.

It is desirable that the second pushing position on the lever should be formed by a downward tab at least twice the distance from the fulcrum that the first pushing position is located. Thus, the lever is formed by a very simple structure.

Furthermore, it is desirable that the second pushing position should come into contact with the memory card only after the ejecting plate disconnects the memory card from the connector terminals. This structure transmits a large force to the memory card when the card is engaged with the contact terminals of the connector and causes the memory card to be disconnected from the connector terminals before the card is moved by the second pushing position.

BRIEF DESCRIPTION OF THE DRAWINGS

FIG. 6(A) is an overall plan view and FIG. 6(B) is a front view of a connector device provided with the ejecting apparatus according to the embodiment of the present invention.

DESCRIPTION OF THE PREFERRED EMBODIMENT

Figure 1:
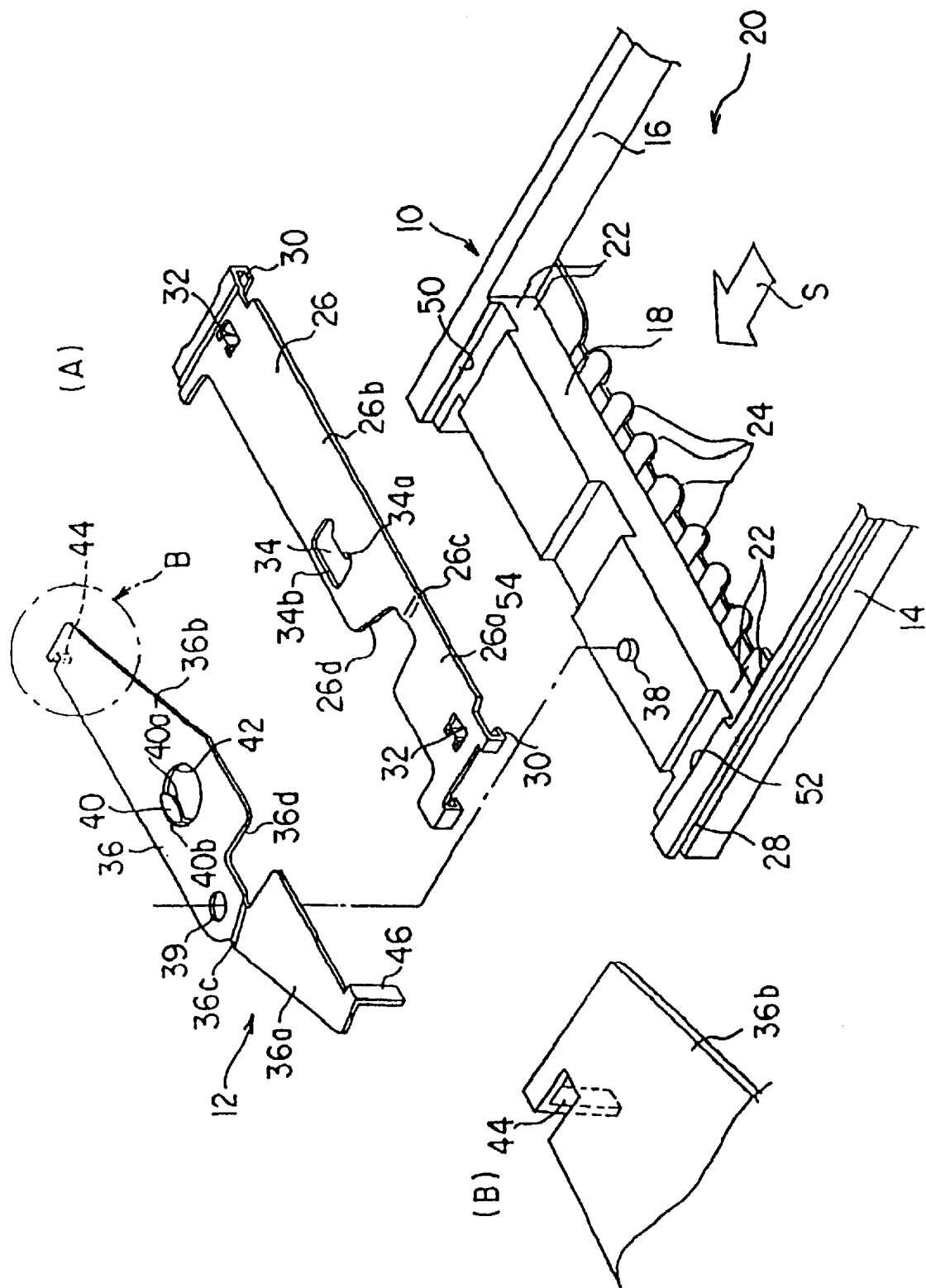
FIG. 1 is a schematic exploded view in perspective of an ejecting apparatus according to a preferred embodiment of the present invention, together with the header of an electrical connector.

Hereinafter, referring to the accompanying drawings, a preferred embodiment of the present invention will be explained.

FIGS. 1 to 6(B) show a connector device using a variable force ejecting apparatus according to the present invention. The connector device includes a connector body or frame 10 and an ejecting apparatus 12. As shown in FIG. 6(B), it is often desirable that two connector devices should be put one on top of another, i.e. the upper connector device and the lower connector device. Since the upper connector device has basically the same structure as that of the lower connector device, only an explanation of the upper one will be given.

The connector frame 10 is molded from suitable resin material and has a pair of parallel rails 14, 16 and a header 18 connecting integrally with these rails 14, 16. Between these rails 14, 16, a slot 20 is formed into which a memory card M (see FIG. 6A) is inserted in the direction of arrow S.

Guide grooves (not shown) that guide the side edges of the memory card M are provided in the sides facing each other of the rails 14, 16. The memory card M may be a card having various types of storing mediums, such as an IC card, a hard disk, a magneto-optical disk, or a card with various I/O functions for modems and local area networks, for example.

A large number of contact terminals such as pin terminals 22 are arranged on the header 18 of the connector frame 10 in such a manner that they pierce through the header. The receptacle contact terminals of the memory card M fit on the ends of those pin terminals 22 projecting into the opening between the rails 14, 16, thereby electrically and mechanically connecting the header 18 to the memory card M. The other ends of the pin terminals are connected to the electric circuitry formed on the circuit board of the electronic equipment (not shown).

To prevent the memory card M from being inserted erroneously, it is desirable that erroneous insertion prevention means should be provided on the rails 14, 16 or header 18 of the connector frame 10. One erroneous insertion prevention means may be guide grooves differing in shape in the rails 14, 16 or that at least one projection is provided in an asymmetrical position on the header 18. In this case, a projection or grooves are made on the memory card M as well. Reference symbol 24 indicates card bus shields that come into contact with the surface of the memory card M. The card bus shields, which are arranged along the width of the connector frame 10 between the rails 14, 16, not only ground the card surface, but also function as an electromagnetic shield between the inside and outside of the memory card M near the contact terminals.

The ejecting apparatus 12 of the embodiment is provided with an ejecting plate 26 formed of a thin metal plate. The ejecting plate 26 extends substantially the width of the memory card M, that is, between the rails 14, 16 of the connector frame 10. The edges on both sides of the ejecting plate slide freely on the rails 14,16. In the embodiment, hooked claws 30, formed at the edges on both sides of the ejecting plate, are fitted in the guide grooves 28 on the outside of the rails 14, 16 which allow the ejecting plate to move in both the insertion direction S and in the removal direction. (The insertion direction S is toward the rear of the connector frame, i.e. toward the header 18 and the removal direction is toward the front of the connector, i.e. away from the header 18 and toward slot 20).

The slidable ejecting plate 26 has a lower parallel plate section 26a arranged closer to the connector frame 10 and an upper plate section 26b raised slightly above the lower plate section 26a. The lower and upper plate sections 26a, 26b are connected at a step section 26c to form an integral, parallel stepped structure. At least one and preferably two engaging tabs 32, for engaging the forward end face of the memory card M project downward from the plate sections 26a, 26b, respectively. The engaging tabs 32 are formed by cutting out and bending the plate material of the plate sections 26a, 26b near the respective side edges. When the ejecting plate 26 is installed on the connector frame 10, the engaging tabs 32 project into the space defined by the slot 20 so as to be able to engage the edge of the memory card M.

At the step section 26c of the ejecting plate 26, a recessed or cutout section 26d is formed. The cutout section 26d receives the cutout section of a lever 36, which will be described later. An opening 34 is made in the upper plate section 26b for interlocking with the lever 36. The opening 34, which is roughly rectangular, is positioned near the midle of the ejecting plate 26, between the rails 14, 16 and centered between the engaging tabs 32, 32. The front edge 34a of opening 34 has a downward stopper tab 35. The stopper tab 35 is formed by cutting out and bending down the plate material. The rear edge 34b of the opening 34 is flat and linear. It is desirable that the stopper tab 35 should be positioned in the middle between the rails 14,16 of the connector frame 10. The engaging tabs 32, 32 are arranged symmetrically on the ejecting plate 26 with the stopper tab 35 in the center.

The ejecting apparatus 12 further includes the lever 36 for moving the ejecting plate 26 in the insertion direction and removal direction of the memory card M. Like the ejecting plate 26, the lever 36 is formed of a thin metal plate but has the reversed stepped structure of ejecting plate 26. Thus, lever 36 has a parallel upper plate arm 36a, a parallel lower plate arm 36b, and a step section 36c between the plate arms 36a, 36b. At the step section 36c, a recessed section or (cutout) 36d is formed that receives the cutout 26d of the ejecting plate 26. The lever 36 is pivotally installed on the header 18 of the connector frame 10 by a pin 38 rising from the header 18 into a through hole 39 in the lever 36. The lever 36 is positioned on the pin 38 in such a manner that the recessed section 36d engages with the recessed section 26d of the ejecting plate 26. Therefore, with the ejecting apparatus 12 installed on the connector frame 10, the upper plate arm 36a of the lever 36 is arranged above the lower plate section 26a of the ejecting plate 26 and the lower plate arm 36b of the lever 36 is placed under the upper plate section 26b of the ejecting plate 26. The hooked claws 30, 30 of the ejecting plate are fitted in the guide grooves 28, 28 of the connector frame 10, respectively, preventing the through hole 39 in the lever 36 from coming off the pivot pin 38.

The lever includes one arm on one side of the pivot pin and another arm, preferably having a greater length, on the other side of the pivot. The other, or longer, arm of the lever 36 has an upward projecting profile 40 that is inserted in the opening 34 in the ejecting plate 26 and forms a first pushing position. Lever 36 also has an opening 42 adjacent to the upward projecting profile 40. The opening 42 receives the stopper tab 35 projecting from the plate section 26b of the ejecting plate when the ejecting plate 26 and the lever 36 are installed on the rails 14, 16 and pivot pin 38 respectively. The upward projecting profile 40 is formed by cutting the opening 42 out of the plate material and bending a portion of the remaining plate upward. The forward rim 40a of the upward projecting profile is convexly curved in the removal direction and the rear rim 40b is convexly curved in the insertion direction S. The rear rim 40b is formed by the conical raised surface of the upward projecting profile and the front rim 40a is the thin edge of the metal plate of the lever 36. The top of the upward projecting profile 40 does not project above the surface of the upper plate section 26b of the ejecting plate 26. Therefore, front rim 40a faces the stopper tab 35 which is hanging down from the front edge 34a of the opening 34 and rear rim 40b faces the flat rear edge 34b of the opening 34 when the lever 36 and ejecting plate 26 are installed on the connector frame 10.

On the end of the other, or longer, arm of the lever 36, a downward tab 44 acts as a second pushing position. The tab 44 is formed near the edge of the plate arm 36b by cutting out the plate material of the lever 36 and bending the tab down. The lower plate arm 36b of the lever 36 is formed so as to have a shorter length than the ejecting plate 26 so as to prevent interference by the engaging tabs 32 of the ejecting plate 26 when the lever 36 is rotated about the pivot pin 38. The tab 44 is positioned so that it only engages the edge of the memory card M when the card M is disconnected completely from the pin terminals 22 of the connector and does not engage with the card M when the card M is still connected to the pin terminals 22. This enables the tab 44 to move the card farther in the removal direction, going beyond the movement of the card caused by the engaging tabs 32. To prevent the tab 44 of the lever 36, and the engaging tabs 32 of the ejecting plate 26 from interfering with the header 18 of the connector frame 10, grooves 50, 52 are made in the corresponding positions on the header 18. The center groove 54 prevents interference with the stopper tab 35 hanging down from the front edge 34a of the opening 34. Although in this embodiment the projecting tab 44 is formed by cutting out a portion of the lever 36 and bending it down, the tab is not limited to that shape. For instance, the tab may take another suitable form, such as a curved surface.

The tip of the upper plate arm 36a of the lever 36, that is, the shorter end from the pivot pin 38, projects from the connector frame 10. A linking tab 46 hangs down from the tip of the plate arm 36a and is operably moved by the rear end of a push rod 56 (see FIG. 2 and FIG. 4).

The push rod 56 in the preferred embodiment is arranged along the outside of the rail 14 so that the rod may slide freely. At the front end of the push rod 56, an operation button 58 that can be pushed in with a finger is provided. When two connector devices are arranged in a two-layered structure having an upper connector device and a lower connector device as in the disclosed embodiment, the two operation buttons 58 for the two push rods 56 may be positioned on the same side as shown in FIG. 6(B) or be positioned on opposite sides.

In the disclosed embodiment, the fulcrum of the lever 36 is located at the fixed position by the pivot pin 38 inserting into the through hole 39. Alternatively, the fulcrum may be moved as the lever 36 is rotated in a similar manner to the way that the curved surface of the upward projecting profile 40 engages with the flat surface of the stopper tab 35.

Figure 2:
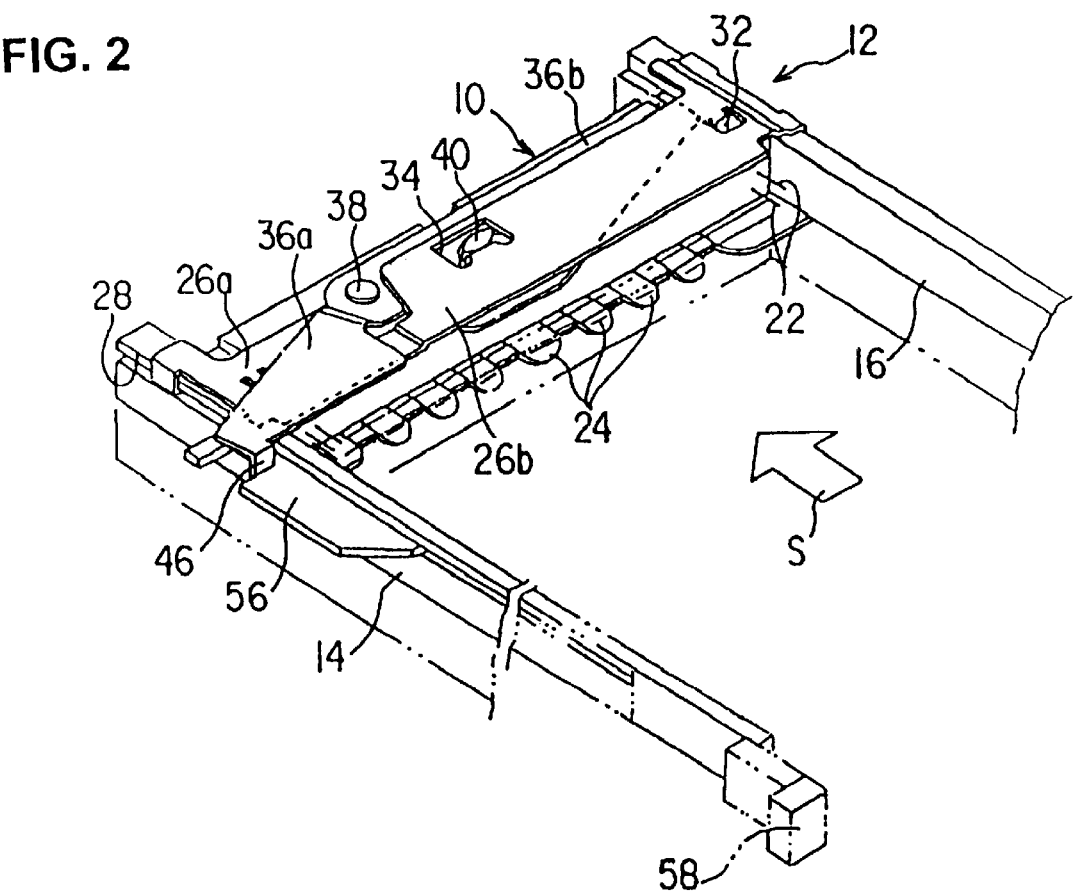
FIG. 2 is a schematic sectional view illustrating the position of each member in the ejecting apparatus when the memory card is fully inserted.
Figure 4:
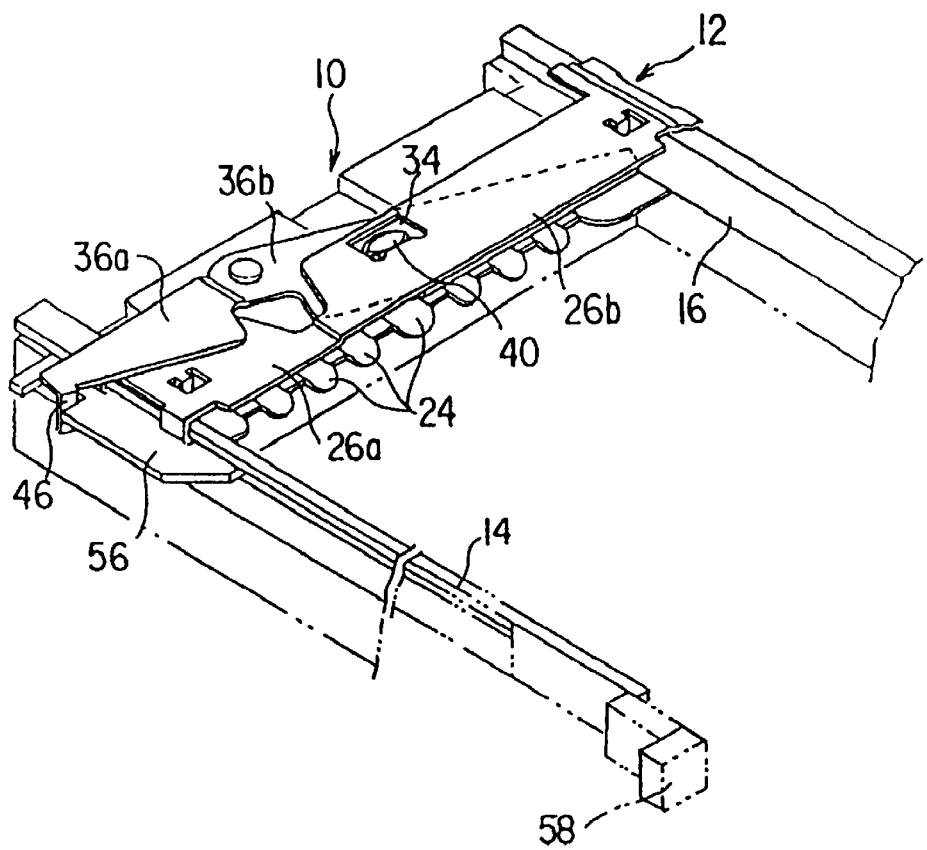
FIG. 4 is a schematic sectional view illustrating the position of each member in the ejecting apparatus after the memory card is removed.

Next, the operation of the ejector device will be explained. FIG. 2 shows the ejecting apparatus 12 into which a memory card M (not shown) has been fully inserted. FIG. 4 and FIG. 6(A) schematically illustrate the ejecting apparatus from which the memory card M (not shown) has been removed.

As shown in FIG. 2, when the memory card M is connected to the pin terminals 22 of the connector frame 10, the ejecting plate 26 is moved by the engaging tab 32 to the rear of the connector device. The upward projecting profile 40 is pushed back by the slidable ejecting plate 26 and the lever 36 is rotated counterclockwise on the pivot pin 38. This causes the push rod 56 to be pushed forward by the link tab 46 of the lever 36, with the operation button 58 projecting outward (i.e. in the opposite direction to the insertion direction S).

Figure 3:
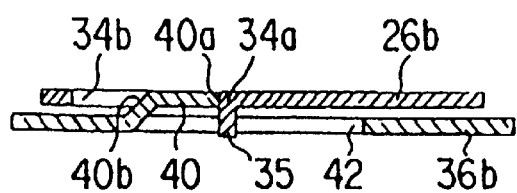
FIG. 3 is a schematic sectional view illustrating how the lever is engaged with the ejecting plate in FIG. 2.

To remove the memory card M from the connector device, the operation button 58 is pushed in the insertion direction S. This moves the linking tab 46 in the insertion direction S, which forces the lever 36 to rotate clockwise on the pivot pin 38, which in turn pushes the ejecting plate 26 in the removal direction, (that is, in the opposite direction to the insertion direction S). At the upward projecting profile 40, the curved front rim 40a of the lever 36 is engaged with the stopper tab 35 as shown in FIG. 3. As the lever 36 rotates, the front rim 40a smoothly rotates on the flat surface of the stopper tab 35, thereby transmitting force from the lever 36 to the ejecting plate 26. This enables the ejecting plate 26 to move in the removal direction. The claw section 30 of the ejecting plate moves along the guide grooves 28 in the rails 14, 16 of the connector frame 10.

The movement of ejecting plate 26 forces the engaging tab 32 to contact the edge of the memory card M, which transmits the force of the lever 36 to the memory card M, thereby disconnecting the contact terminals of the memory card M completely from the pin terminals 22. Since the upward projecting profile 40 is located relatively close to the pivot pin 38 which serves as a fulcrum, the memory card M can be disconnected from the connector terminals easily without exerting a large force on the push rod 56.

As the push rod 56 is pressed further, the lever 36 is rotated further clockwise, which causes the downward tab 44 at the distal end of the plate arm 36*b* to come into direct contact with the edge of the memory card M. The memory card M was heretofore in contact with the engaging tab 32 and moving in the removal direction but can not go beyond the movement limit of the engaging tab 32. The downward tab 44 now moves the memory card M farther in the removal direction until the card projects from the connector device and the electronic equipment. The tab 44 is positioned at the distal end of the plate arm 36*b* from the pivot pin 38. The memory card M is thus disconnected from the contact terminals and moved out from the connector frame by a distance greater than the distance the push rod 56 is moved in.

Figure 5:
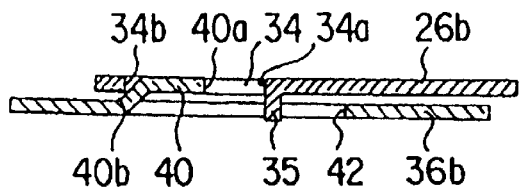
FIG. 5 is a schematic sectional view illustrating how the lever is engaged with the ejecting plate in FIG. 4.

When the memory card M is inserted, the lever 36 and ejecting plate 26 are moved in the reverse order of what has been explained above. Specifically, when the memory card M is inserted in the slot 20 between the rails 14, 16, the front end of the memory card M first comes into contact with the tab 44 of the lever 36, which rotates the lever 36 counterclockwise around the pivot pin 38. The upward projecting profile 40 of the lever 36 causes the rear rim 40*b* to come into contact with the rear edge 34*b* of the opening 34 in the ejecting plate 26 as shown in FIG. 5. The lever 36 moves the ejecting plate 26 in the insertion direction S as the curved rim 40*b* moves rotationally along the rear edge 34*b*. Then the memory card M comes into contact with the engaging tabs 32, 32 and pushes the ejecting plate 26 in the insertion direction, which allows the memory card M to connect with the pin terminals 22. As shown in FIG. 3, the ejecting plate 26 rotates the lever 36 further counterclockwise, causing the curved front rim 40*a* of the projecting profile 40 to move rotationally on the stopper tab 35 which is hanging down from the front edge 34*a* of the opening 34, and moves the lever 36 to the installed position shown in FIG. 2. The push rod 56 is moved outward by the link tab 46 of the lever 36, which causes the operation button 58 to project out from the surface of the electronic equipment. Meanwhile, the installed memory card has its surface grounded by the cardbus shield 24, thereby preventing the influence of electromagnetic waves.

Because the projecting profile 40, with the pivot pin 38 serving as a fulcrum, first moves the ejecting plate 26 in the removal direction, a large leveraged force can be exerted to disconnect the contact terminals of the memory card M from the contact terminals 22 of the header 18. In addition, because the tab 44 is a greater distance from the pivot pin 38 than the engaging tabs 32, the tab 44 pushes directly on the memory card M (after being removed from the pin terminals 22) and directly moves the card a greater distance out than the movement in of the push rod. The memory card M can not only be moved quickly off the contact terminals but also can be removed substantially from the connector frame so the card is manually accessible. Furthermore, since the ejecting plate 26 and lever 36 are installed directly on the connector frame 10, a cover plate, which is needed in a conventional ejecting apparatus, is not necessary. The apparatus is thus thinner and more compact, and the construction is straight forward to operate.

As presently described, the ejecting apparatus of the present invention causes the first pushing position (40*a*) of the lever to be rotated by the initial movement of the push rod 56. The lever moves the ejecting plate 26 to disconnect the contact terminals of the memory card from the contact terminals of the connector. With further movement of the push rod, the second pushing position 44 then pushes directly on the memory card (that is now disconnected from the connector terminals) and thereby further moves the card in the removal direction. This efficient operation of the ejecting mechanism is effected by locating the first pushing position (upward projecting profile 40) on the lever between the fulcrum (i.e. pivot pin 38) and the second pushing position (tab 44). Easy manual handling of the memory card is facilitated by making the length of the memory card sticking out from the connector larger, especially with the compact, simple configuration of the present invention.

What is claimed is:

1. An ejecting apparatus for disconnecting and removing a PC card from an electrical connector having a connector frame with a header containing a plurality of contact terminals that connect to a plurality of mating contact terminals on the card, said ejecting apparatus comprising:
   a. a slidable ejecting plate having an engaging tab for engaging said card, said ejecting plate guided in an insertion direction in which the card is inserted toward the header, and in a removal direction in which the card is removed away from the header by said ejecting plate;
   b. a lever rotatably mounted on a fulcrum on said connector frame so that the lever may be rotated about said fulcrum, said lever having a first arm on one side of the fulcrum and a second arm on the other side of the fulcrum, the first arm being rigid, the second arm being rigid;
   c. a reciprocal push rod associated with one of said arms of the lever to rotate the lever about the fulcrum;
   d. an ejecting plate pushing position on the other arm of said lever that is brought into contact with said ejecting plate to move the ejecting plate in the removal direction when the lever is rotated by the push rod to disconnect the contact terminals of the card from the contact terminals of the header; and
   e. a card pushing position on the other arm of said lever to directly push the card after the terminals of the card have been disconnected from the connector terminals of the header so that the card is moved farther in the removal direction, wherein said ejecting plate pushing position is located on said lever between said fulcrum and said card pushing position.

2. The ejecting apparatus according to claim 1, wherein said card pushing position is located on said lever at a greater distance from the fulcrum than the ejecting plate pushing position.

3. The ejecting apparatus according to claim 1, wherein the card pushing position is located on said lever at least twice the distance from the fulcrum as the ejecting plate pushing position.

4. The ejecting apparatus according to claim 1, wherein the card pushing position is located on said lever approximately three times the distance from the fulcrum as the ejecting plate pushing position.

5. The ejecting apparatus according to claim 1, wherein said lever has a stepped structure having an upper planar arm on one side of the fulcrum and a parallel lower planar arm on the other side of the fulcrum, and said slidable plate is a reverse stepped structure to that of the lever and guides the lower planar arm of the lever between the plate and the connector frame.

6. The ejecting apparatus according to claim 1, wherein said card pushing position is a substantially rigid structure so that said card pushing position does not generally deflect upon engaging the card.

7. The ejecting apparatus according to claim 1, wherein said second location is substantially rigid so that said card pushing position does not generally deflect upon engaging the card.

8. The ejecting apparatus according to claim 1 wherein said ejecting card pushing position is located substantially at the end of said lever.

9. The ejecting apparatus according to claim 1, wherein said other arm of said lever further comprises two side edges and said ejecting plate pushing position is located between said two side edges.

10. The ejecting apparatus according to claim 9, wherein said ejecting card pushing position is substantially coincident with one of said side edges of said other arm of said lever.

11. The ejecting apparatus according to claim 1, wherein said card pushing position of the lever comes into contact with the card only after the ejecting plate disconnects the contact terminals of the card completely from the contact terminals of the header.

12. The ejecting apparatus according to claim 11, wherein the one arm of the lever has a predetermined length and the ejecting plate pushing position is located on the other arm of the lever at distance from said fulcrum that is less than the predetermined length of the one arm.

13. A method for disconnecting and removing a PC card from an electrical connector having a connector frame with a header containing a plurality of contact terminals that connect to a plurality of mating contact terminals on the card, said method comprising the steps of:

a. providing a slidable ejecting plate for pushing said card from the rear of said card;

b. providing a rotatable and rigid lever arm having first and second contact points;

c. rotating said rigid lever arm so that said first contact point comes into contact with said ejecting plate and moves said ejecting plate to push said card and disconnect the contact terminals of the card from the contact terminals of the header;

d. continuing to rotate said rigid lever arm until said second contact point comes into contact with the rear of said card and moves said card away from said ejecting plate and further in said removal direction.

14. The method of claim 13 wherein said continuing to rotate step d occurs after said rotating step c such that the card is disconnected from the contact terminals before the second contact point contacts the card.

15. The method of claim 14 wherein the lever arm is rigid on each side of a fulcrum thereof such that said continuing to rotate step d includes urging the card by the rigid lever arm.

16. The method of claim 14 wherein the ejecting plate is substantially stationary during most of said continuing to rotate step d.

* * * * *